United States Patent [19]

Drent et al.

[11] Patent Number: 4,806,630

[45] Date of Patent: Feb. 21, 1989

[54] CATALYTIC POLYMERIZATION OF CARBON MONOXIDE AND OLEFIN, WITH ORGANO NITRO OR ORGANO NITRITE COMPOUND ADDITIVE

[75] Inventors: Eit Drent; Richard L. Wife, both of Amsterdam, Netherlands

[73] Assignee: Shell Oil Company, Houston, Tex.

[21] Appl. No.: 99,263

[22] Filed: Sep. 21, 1987

[30] Foreign Application Priority Data

Dec. 1, 1986 [NL] Netherlands ............... 8603062

[51] Int. Cl.$^4$ ............................................. C08G 67/02
[52] U.S. Cl. .................................................. 528/392
[58] Field of Search ......................................... 528/392

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 4,474,978 | 10/1984 | Drent | 560/24 |
| 4,634,793 | 1/1987 | Drent | 560/243 |

FOREIGN PATENT DOCUMENTS

| | | |
|---|---|---|
| 121965 | 8/1984 | European Pat. Off. |
| 181014 | 5/1986 | European Pat. Off. |
| 213671 | 3/1987 | European Pat. Off. |
| 1081304 | 3/1965 | United Kingdom . |
| 2058074 | 8/1979 | United Kingdom . |

OTHER PUBLICATIONS

Kirk Othmer Encyclopedia of Chemical Technology, Second Edition vol. 12, pp. 132, 1967.

*Primary Examiner*—Harold D. Anderson

[57] ABSTRACT

An improved process for producing polymer of carbon monoxide and at least one ethylenically unsaturated hydrocarbon comprises contacting the carbon monoxide and hydrocarbon under polymerization conditions in the presence of a catalyst formed from a palladium compound, an anion of non-hydrohalogenic acid having a pKa less than about 6, a bidentate phosphorus ligand and additionally an organic nitro or nitrate compound.

10 Claims, No Drawings

CATALYTIC POLYMERIZATION OF CARBON MONOXIDE AND OLEFIN, WITH ORGANO NITRO OR ORGANO NITRITE COMPOUND ADDITIVE

This invention relates to an improved process for the production of polymers of carbon monoxide and at least one ethylenically unsaturated hydrocarbon. More particularly, the invention relates to an improved process wherein the reactants are contacted in the presence of a catalyst formed from a palladium compound, an anion of a non-hydrohalogenic acid having a pKa less than about 6, certain bidentate ligands of phosphorus and, additionally, an organic nitro or nitrite compound.

BACKGROUND OF THE INVENTION

Polymers of carbon monoxide and ethylenically unsaturated hydrocarbons have been known for some time. Brubaker, U.S. Pat. No. 2,495,286, produced polymers of relatively low carbon monoxide content by reaction of ethylene and carbon monoxide in the presence of free radical catalysts. U.K. Patent No. 1,081,304 disclosed the production of polymers in the presence of alky-phosphine complexes of palladium. Nozaki extended the scope of this reaction to include aryl phosphine complexes of palladium, U.S. Pat. No. 3,689,460, to include tetrakis(triarylphosphine) complexes of palladium, U.S. Pat. No. 3,694,412 and to acidic cyanide complexes of palladium, U.S. Pat. No. 3,835,123.

More recently, a class of linear alternating polymers has been produced in good yield and the polymers have attracted greater interest. Production of this class of polymers, known as polyketones, is illustrated by published European patent application 121,965 which describes reaction of carbon monoxide with ethylenically unsaturated hydrocarbon(s) in the presence of compounds of certain Group VIII metals, anions of nonhydrohalogenic acids of pKa less than about 2 and bidentate ligands of phosphorus. In copending U.S. application Ser. No. 940,876 filed Dec. 10, 1986, it is disclosed that certain oxidizing agents improve the performance of polyketone polymerization catalysts formed from compounds of the Group VIII metals, anions of non-hydrohalogenic acids of pKa less than about 6 and bidentate nitrogen ligands including organic nitro and nitrite compounds as well as others such as quinones. While it is known that quinones may also improve the performance of polyketone polymerization catalysts which incorporate bidentate phosphorus ligands, e.g., copending U.S. patent application Ser. No. 021,946, filed Mar. 5, 1987, it would be of advantage to extend the promotional effects of organic nitro and nitrite compounds to catalytic systems containing bidentate phosphorus ligands.

SUMMARY OF THE INVENTION

It has now been found that an improved process for the production of polyketone polymers results when carbon monoxide and at least one olefinically unsaturated hydrocarbon are contacted under polymerization conditions in the presence of a catalyst composition formed from a mixture of a palladium compound, an anion of a non-hydrohalogenic acid having a pKa less than about 6, a bidentate ligand of phosphorus and an organic nitro or nitrate compound. The presence of the organic nitro or nitrate compound serves to enhance the activity of the catalyst, thereby producing polyketone polymer at a greater rate.

DESCRIPTION OF THE INVENTION

In the process of the invention, carbon monoxide is contacted with at least one ethylenically unsaturated hydrocarbon in the presence of a catalyst composition under polymerization conditions. The catalyst composition is formed from a mixture of palladium compound, the anion of a non-hydrohalogenic acid having a pKa below about 6, a bidentate phosphorus ligand of specified structure and an organic nitro or nitrite compound.

The palladium compound of the catalyst composition is the salt of palladium and an acid, organic or inorganic. The palladium salt is preferably a palladium carboxylate, particularly the salt of a mono-carboxylic acid or a dicarboxylic acid. The preferred palladium carboxylates are palladium alkanoates of up to about 10 carbon atoms. While palladium alkanoates such as palladium propionate or palladium octanoate are usefully employed in the process of the invention, in part for reasons of availability the preferred palladium alkanoate is palladium acetate.

The anion component of the catalyst composition is the anion of an acid having a pKa less than about 6, preferably less than about 2, as determined in aqueous solution at 18° C. Preferred anions are anions of acids which are oxygen-containing acids including inorganic acids such as sulfuric acid, perchloric acid, phosphoric acid and nitrous acid as well as organic acids including sulfonic acids such as para-toluenesulfonic acid, trifluoromethanesulfonic acid, 2-hydroxypropane-2-sulfonic acid and methanesulfonic acid and carboxylic acids such as trifluoroacetic acid, trichloroacetic acid, dichloroacetic acid, difluoroacetic acid, tartaric acid, and 2,5-dihydroxybenzoic acid. Trifluoroacetic acid and p-toluenesulfonic acid comprise a preferred class of acids whose anions are suitable in the process of the present invention. The anion is employed in a quantity from about 0.5 equivalent to about 200 equivalents per gram-atom of palladium (as the compound), preferably from about 1 equivalent to about 100 equivalents of anion per gram-atom of palladium.

The anion is provided in the form of the acid as such or alternatively in the form of a salt. When a salt is employed to provide the anion, non-noble transition metal salts, i.e., salts of metals of Groups IIIB–VIIB of the Periodic Table of Elements, are usefully employed. Suitable salts include those salts of copper, zirconium and vanadium. In the modifications which provide the anion as a metal salt, copper salts are preferred. It is also suitable, although not preferred, to provide the palladium compound and the anion as a single compound, e.g., palladium p-tosylate (p-toluenesulfonate).

The bidentate phosphorus ligand employed in the catalyst composition of the invention is represented by the formula

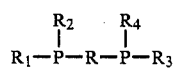

wherein $R_1$, $R_2$, $R_3$, and $R_4$ independently are monovalent aryl of from 6 to 20 carbon atoms inclusive, preferably from 6 to 10 carbon atoms inclusive, and are hydrocarbyl aryl groups or are substituted hydrocarbyl where any substituents are polar, particularly alkoxy. Illustrative of suitable $R_1$, $R_2$, $R_3$ and $R_4$ groups are phenyl, naphthyl, tolyl, 2,4-dimethylphenyl, 2-methoxyphenyl, 2-ethoxynaphthyl, 3-propoxyphenyl, 2-methyl-4-methoxyphenyl, 2,4-dimethoxyphenyl and 2-propoxyphenyl. The R group is a divalent hydrocarbyl bridging group of from 2 to 10 carbon atoms inclusive with from 2 to 4 carbon atoms in the phosphorus-phosphorus bridge. Preferred as the R group is the trimethylene group, i.e., the $CH_2$—$CH_2$—$CH_2$—group.

The groups $R_1$, $R_2$, $R_3$ and $R_4$ are the same or are different. It is generally preferred that these groups be the same and for best results each of $R_1$, $R_2$, $R_3$ and $R_4$ will be substituted with a polar group, particularly alkoxy, in a position ortho to the phosphorus.

Illustrative of bidentate phosphorus ligands are 1,3-bis(diphenylphosphino)propane, 1,3-bis[di(2-methoxyphenyl)phosphino]propane, 1,3-bis[di(4-methylphenyl)phosphino]propane, 1,3-bis[di(4-methoxyphenyl)phosphino]propane, 1,3-bis[di(2,6-dimethoxyphenyl)phosphino]propane and 1,3-bis[di(2,4,6-trimethoxy)phenyl]phosphinopropane. The bidentate phosphorus ligands are suitably employed in a quantity from about 0.1 mol to about 3 mol per mol of palladium compound, preferably in a quantity from about 0.75 mol to about 2 mol per mol of palladium compound.

The catalyst compositions of the invention are improved by the incorporation therein of an organic nitro or nitrite compound. The presence of such compounds appears to result in enhanced catalyst activity and results in more rapid rates of reaction. In the embodiments where the catalyst is formed from a mixture which includes an organic nitrite the preferred organic nitrites are hydrocarbyl lower alkyl nitriles wherein the alkyl has up to 6 carbon atoms. Illustrative of such alkyl nitrites are methyl nitrite, ethyl nitrite, propyl nitrite, butyl nitrite and hexyl nitrite. Butyl nitrite is particularly preferred. When the organic nitro or nitrite compound is an organic nitro compound, the compound is a lower aliphatic nitro compound, preferably hydrocarbyl, or is an aromatic nitro compound which is hydrocarbyl or is substituted hydrocarbyl. Typical nitroalkanes are nitromethane, nitroethane, 1-nitropropane, 2-nitropropane, 3-nitrohexane and 1-nitro-hexane. The preferred nitro compound of this class is 1-nitro-propane.

Preferred, however, in the catalysts of the process of the invention are aromatic nitro compounds of up to 2 nitro groups and up to 10 carbon atoms which are otherwise hydrocarbyl or are substituted hydrocarbyl containing substituents such as halo, particularly fluoro and chloro, haloalkyl, alkoxy, hydroxy, carbalkoxy and cyano. Illustrative of suitable aromatic nitro compounds are hydrocarbyl nitro compounds such as nitrobenzene, 1-nitronaphthalene, 4-methylnitrobenzene, 3-ethylnitrobenzene, 2,4-dimethylnitrobenzene and 4-methyl-1,3-dinitrobenzene. Also suitable are halo nitro organic compounds such as 3-chloronitrobenzene, 4-fluoronitrobenzene, 2,4-dichloronitrobenzene and 2-fluoro-6-chloronitrobenzene; haloalkyl nitrobenzenes such as 4-trifluoromethylnitrobenzene and 3-trichloromethylnitrobenzene; alkoxy nitrobenzenes such as 2-methoxynitrobenzene and 4-ethoxynitrobenzene; hydroxy nitro compounds such as 2-hydroxynitrobenzene; carboalkoxy nitrobenzenes such as 4-carbethoxynitrobenzene; and cyano nitrobenzenes such as 4-cyanonitrobenzene. Particularly preferred as the aromatic nitro compound is nitrobenzene, 4-isopropylnitrobenzene or 3-trifluoromethylnitrobenzene.

The organic nitro or nitrite compound is employed in a quantity from about 1 mol to about 10,000 mol per gram-atom of palladium, preferably from about 1 mol to about 5,000 mol per gram-atom of palladium.

The polymerization process comprises contacting the catalyst with carbon monoxide and at least one ethylenically unsaturated hydrocarbon. Suitable hydrocarbons have from 2 to 20 carbon atoms inclusive, particularly from 2 to 10 carbon atoms and preferably are $\alpha$-olefins. The $\alpha$-olefins are wholly aliphatic such as ethylene, propylene, butylene, 1-octene and 1-dodecene or have aryl substituents on a carbon atom of the ethylenic unsaturation, e.g., styrene, p-methylstyrene, m-ethylstyrene and p-isopropylstyrene. The preferred class of polymers produced according to the improved process invention are copolymers of carbon monoxide and ethylene or terpolymers of carbon monoxide, ethylene and a second $\alpha$-olefin, particularly propylene.

The polymers are linear alternating polymers of substantially equimolar quantities of carbon monoxide and unsaturated hydrocarbon. Within the reaction mixture, molar ratios of carbon monoxide to unsaturated hydrocarbon from about 10:1 to about 1:5 are satisfactory with molar ratios from about 5:1 to about 1:2 being preferred. When copolymers are desired, the total quantity of hydrocarbon will consist of a single unsaturated hydrocarbon, but when terpolymers are desired the molar ratio of first hydrocarbon to second hydrocarbon will be from about 400:1 to about 1:1, preferably from about 100:1 to about 10:1.

The catalyst is provided in a catalytic amount. Suitable quantities of catalyst are those which provide from about $1 \times 10^{-7}$ to about $1 \times 10^{-3}$ gram-atom of palladium per mol ethylenically unsaturated hydrocarbon, preferably from about $1 \times 10^{-6}$ to about $1 \times 10^{-4}$ gram-atom of palladium per mol of ethylenically unsaturated hydrocarbon.

Polymerization is conducted under polymerization conditions in the liquid phase or in the gaseous phase. In the embodiments of the process employing liquid phase polymerization, the reaction is conducted in the presence of a liquid diluent such as a lower alkanol, e.g., methanol or ethanol. In the gaseous phase polymerizations, reaction is typically conducted in the substantial absence of diluent.

The catalyst is employed as an unsupported material, particularly in liquid phase reactions, or is employed supported on a carrier which is preferred for gas phase polymerizations. When a supported catalyst is desired, the catalyst precursors are dissolved or suspended in a diluent such as a lower alkanol and the resulting mixture is used to impregnate the carrier. Preferred carrier materials are inert porous materials and are organic or inorganic. Illustrative carriers are silica, alumina, talc, charcoal, cellulose, dextrose, dextran gel as well as polymeric carriers such as polyethylene and polypropylene. Also suitable, and generally preferred as carrier, is a polyketone polymer of the general type produced by the present process. The preferred carrier need not be produced by the specific process of the present invention, but only by a process which will result in a linear alternating polymer of carbon monoxide and at least one ethylenically unsaturated hydrocarbon. Subsequent to impregnation of the carrier, any excess diluent is removed prior to use of the supported catalyst.

The method of contacting reactants and catalyst is not critical and contact is effected by shaking, stirring or other conventional methods. Typical reaction temperatures are from about 20° C. to about 200° C., preferably from about 30° C. to about 150° C. Suitable reaction pressures are from about 1 bar to about 200 bar and in particular from about 20 bar to about 100 bar. Subsequent to reaction, the polymer product is recovered, if desired, by conventional methods such as filtration or decantation. The reaction product will on occasion include contaminants such as residues of the catalyst or carrier which are removed, if desired, by treatment with a solvent which is selective for the contaminants.

The polymer products are known materials of known properties and have wide application as premium thermoplastics. By way of illustration, the polymers are extruded into films or sheets or molded into billets which are in turn shaped into containers for the food and drink industry or into parts for the automotive industry. The polymers also find application when formed by conventional methods into cables or large surface objects for use in the construction industry.

The invention is further illustrated but not to be limited by the following Comparative Examples (not of he invention) and Illustrative Embodiments.

Comparative Example I

A copolymer of carbon monoxide and ethylene was prepared by the following procedure. To a stirred autoclave of 300 ml capacity was charged a catalyst solution comprising 50 ml of methanol, 0.1 mmol of palladium acetate, 0.5 mmol of copper para-tosylate (para-toluenesulfonate) and 0.15 mmol of 1,3-bis(diphenylphosphino)propane. After removal of the air present by evacuation, ethylene was introduced at 25° C. until a pressure of 30 bar was reached and then carbon monoxide was added until a pressure of 60 bar was reached. After 3 hours the polymerization was terminated by releasing the pressure. The polymer product was removed by filtration, washed with methanol and dried in vacuo at room temperature. 5.8G of copolymer was obtained, produced at a calculated rate of 190 g of copolymer/g Pd/hr.

Comparative Example II

A carbon monoxide/ethylene copolymer was produced by the procedure of Comparative Example I except that 1 mmol of para-toluenesulfonic acid was employed in the catalyst solution instead of the copper para-tosylate and the reaction time was 2 hours instead of 3 hours. The copolymer product, 4 g, was produced at the calculated rate of 200 g of copolymer/g Pd/hr.

Comparative Example III

A carbon monoxide/ethylene copolymer was produced by the procedure of Comparative Example I except that 0.5 mmol of vanadyl sulfate was used instead of copper para-tosylate. The copolymer product, 1.2 g, was produced at a calculated rate of 40 g of copolymer/g Pd/hr.

Comparative Example IV

When 0.5 mmol of zirconium sulfate was used in place of the copper para-tosylate in the procedure of Comparative Experiment I, 1.7 g of copolymer was produced at a calculated reaction rate of 6.5 g of copolymer/g Pd/hr.

Comparative Example V

When 0.5 mmol of aluminum sulfate was employed instead of the copper para-tosylate of Comparative Example I, 1.1g of copolymer was obtained at a calculated reaction rate of 45 g of copolymer/g Pd/hr.

Comparative Example VI

A carbon monoxide/ethylene copolymer was produced in the gaseous phase by the following procedure. A supported catalyst was produced by absorbing on 5 g of an alternating carbon monoxide/ethylene copolymer a catalyst solution comprising 2 ml of methanol, 0.0189 mmol of palladium acetate, 0.0374 mmol of para-toluenesulfonic acid and 0.0198 mmol of 1,3-bis(diphenylphosphino)propane.

The catalyst was charged to a stirred autoclave of 300 ml capacity. The air present in the autoclave was removed by pressurizing the autoclave with ethylene and then releasing the pressure three times. A 1:1 mixture (by mol) of carbon monoxide and ethylene was introduced into the autoclave under pressure and the contents of the autoclave were heated until a temperature of 86° C. and a pressure of 55 bar were obtained. The pressure was maintained during a 2.5 hour reaction period by the continuing addition of the 1:1 mixture. The polymerization was then terminated by cooling to room temperature and releasing the pressure. The copolymer product was dried for 16 hours at 50° C. From the weight of copolymer produced, the reaction rate was calculated to be 3400 g of copolymer/g Pd/hr.

Comparative Example VII

The procedure of Comparative Example VI was repeated except that the catalyst solution comprised 2 ml of methanol, 0.019 mm of palladium acetate, 0.039 mmol of para-toluenesulfonic acid and 0.022 mmol of 1,3-bis[di(2-methoxyphenyl)phosphino]propane, the reaction temperature was 95° C. instead of 86° C. and the reaction time was 2 hours instead of 2.5 hours. From the copolymer obtained, the reaction rate was calculated to be 2900 g of copolymer/g Pd/hr.

Illustrative Embodiment I

The procedure of Comparative Example I was employed to produce a carbon monoxide/ethylene copolymer with the difference that the catalyst solution additionally contained 10 mmol of nitrobenzene. Copolymer product, 7.1 g, was produced at the calculated rate of 235 g of copolymer/g Pd/hr.

Illustrative Embodiment II

The procedure of Comparative Example I was used to prepare a carbon monoxide/ethylene copolymer with the difference that the catalyst solution additionally contained 50 ml of nitrobenzene. A total of 7.3 g of copolymer was produced at a calculated rate of 245 g of copolymer/g Pd/hr.

Illustrative Embodiment III

The procedure of Comparative Example I was employed to produce a carbon monoxide/ethylene copolymer with the differences that the catalyst solution additionally contained 10 mmol of 3-chloro-4-methylnitrobenzene and the reaction time was 1.5 hours instead of 3 hours. The copolymer product, 4.3 g, was obtained at a calculated rate of 285 g of copolymer/g Pd/hr.

Illustrative Embodiment IV

A carbon monoxide/ethylene copolymer was produced substantially by the procedure of Comparative Experiment I except that the catalyst solution additionally contained 1 ml of butyl nitrite and the reaction time was 2 hours instead of 3 hours. The copolymer product, 4.4 g, was produced at a calculated reaction rate of 220 g of copolymer/g Pd/hr.

Illustrative Embodiment V

The procedure of Comparative Example I was substantially followed to prepare a carbon monoxide/ethylene copolymer, with the differences that the catalyst solution additionally contained 10 mmol of 3,4-dichloronitrobenzene and the reaction was 2 hours instead of 3 hours. A total of 4.4 g of copolymer was produced at a calculated rate of 220 g of copolymer/g Pd/hr.

Illustrative Embodiment VI

The procedure of Comparative Example I was substantially followed to produce a carbon monoxide/ethylene copolymer except that the catalyst solution additionally contained 10 mmol of 3-(trifluoromethyl)nitrobenzene and the reaction time was 2 hours instead of 3 hours. 5.4 Grams of copolymer were produced at a calculated reaction rate of 270 g of copolymer/g Pd/hr.

Illustrative Embodiment VII

The procedure of Comparative Example I was followed to produce a carbon monoxide/ethylene copolymer except that the catalyst solution additionally contained 10 mmol of 4-methyl-1,3-dinitrobenzene and the reaction time was 1.5 hours instead of 3 hours. The copolymer product, 4.4 g, was obtained at a calculated rate of 295 g of copolymer/g Pd/hr.

Illustrative Embodiment VIII

The procedure of Comparative Example I was followed to prepare a carbon monoxide/ethylene copolymer with the differences that the catalyst solution additionally contained 10 mmol of 1-nitropropane and the reaction time was 1.5 hours instead of 3 hours. The copolymer product, 3.6g, was produced at a calculated rate of 250 g of copolymer/g Pd/hr.

Illustrative Embodiment IX

The procedure of Comparative Example I was followed to produce a carbon monoxide/ethylene copolymer with the differences that the catalyst solution contained 1 mmol of para-toluenesulfonic acid instead of 0.5 mmol of copper p-tosylate and additionally contained 10 mmol of 4-isopropynitrobenzene and the reaction time was 1 hour instead of 3 hours. A total of 2.7 g of copolymer was obtained at a calculated rate of 270 g of copolymer/g Pd/hr.

Illustrative Embodiment X

A copolymer of carbon monoxide and ethylene was prepared by the procedure of comparative Example 1 with the dfferences that the catalyst solution contained 5 mmol of vanadyl sulfate instead of 0.5 mmol of copper para-tosylate and additionally contained 10 mmol of 4-methyl-1,3-dinitrobenzene and the reaction time was 1.5 hours instead of 3 hours. The copolymer product, 3.4 g was produced at a calculated rate of 225 g of copolymer/g Pd/hr.

Illustrative Embodiment XI

The procedure of Comparative Example I was used to prepare a carbon monoxide/ethylene copolymer, except that the catalyst solution contained 0.5 mmol of zirconium sulfate instead of 0.5 mmol of copper p-tosylate and additionally contained 10 mmol of 4-isopropylnitrobenzene and the reaction time was 2 hours instead of 3 hours. 3 Grams of copolymer were obtained at a calculated rate of 150 g of copolymer/g Pd/hr.

Illustrative Embodiment XII

The procedure of Comparative Example I was followed to produce a carbon monoxide/ethylene copolymer except that the catalyst solution contained 0.5 mmol of aluminum sulfate instead of 0.5 mmol of copper p-tosylate and additionally contained 10 mmol of 4-methyl-1,3-dinitrobenzene. The copolymer product, 3 g, was produced at a calculated reaction rate of 100 g of copolymer/g Pd/hr.

Illustrative Embodiment XIII

The procedure of Comparative Example VI was followed to prepare a carbon monoxide copolymer with the exceptions that the catalyst solution additionally contained 9.8 mmol of nitrobenzene, the reaction temperature was 85° C. instead of 86° C. and reaction time was 2 hours instead of 2.5 hours. From the copolymer product obtained, the calculated reaction rate was 4900 g of copolymer/g Pd/hr.

Illustrative Embodiment XIV

The procedure of Comparative Example VI was repeated to prepare a carbon monoxide/ethylene copolymer with the differences that the catalyst solution contained 2 ml of methanol, 0.019 mmol of palladium acetate, 0.039 mmol of p-toluenesulfonic acid, 0.022 mmol of 1,3-bis[di(2-methoxyphenyl)phosphino]propane and 9.8 mmol of nitrobenzene, the reaction temperature was 95° C. instead of 86° C. and the reaction time was 1.2 hours instead of 2.5 hours. From the copolymer obtained, the calculated reaction rate was 7700g of copolymer/g Pd/hr.

With the acid of $^{13}$C-NMR analysis it was determined that the copolymers produced in Comparative Examples I-VII and Illustrative Embodiments I-XIV had a linear alternating structure consisting of the units

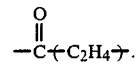

Each copolymer had a melting point of 257° C.

Illustrative Embodiment XV

When the procedure of Illustrative Embodiment I is repeated in the additional presence of propylene, a carbon monoxide/ethylene/propylene terpolymer will be obtained at a satisfactory reaction rate.

What is claimed is:

1. In the process of producing linear alternating polymers of carbon monoxide and at least one ethylenically unsaturated hydrocarbon by contacting the carbon monoxide and unsaturated hydrocarbon under polymerization conditions in the presence of a catalyst composition formed from a mixture of a palladium compound, the anion of a non-hydrohalogenic acid having a pKa below about 6 and a bidentate phosphorus ligand, the improvement wherein the mixture from which said catalyst composition is formed additionally contains an organic nitro compound or an organic nitrite compound.

2. The process of claim 1 wherein the organic nitro or nitrite compound is selected from hydrocarbyl lower alkyl nitrite, hydrocarbyl lower alkyl nitro compound or aromatic nitro compounds of up to 10 carbon atoms.

3. The process of claim 2 wherein the organic nitro or nitrite compound is butyl nitrite.

4. The process of claim 2 wherein the organic nitro or nitrite compound is 1-nitropropane.

5. The process of claim 2 wherein the organic nitro or nitrite compound is aromatic nitro compound of up to 2 nitro groups and 10 carbon atoms selected from hydrocarbyl aromatic nitro compound or substituted hydrocarbyl aromatic nitro compound wherein any substituents are halo, haloalkyl, hydroxy, carbalkoxy or cyano.

6. The process of claim 5 wherein the aromatic nitro compound is nitrobenzene, 4-isopropylnitrobenzene or 3-trifluoromethylnitrobenzene.

7. The process of claim 6 wherein the aromatic nitro compound is nitrobenzene.

8. In the process of producing polymers of carbon monoxide and ethylene by contacting carbon monoxide and ethylene under polymerization condition in the presence of a catalyst composition formed from a mixture of a palladium carboxylate, the anion of an oxygen-containing acid having a pKa below about 2 and a bidentate phosphorus ligand of the formula

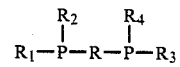

wherein each of $R_1$, $R_2$, $R_3$ and $R_4$ is monovalent aryl of from 6 20 carbon atoms inclusive and R is trimethylene, the improvement wherein the mixture from which the catalyst composition is formed additionally contains an organic nitro compound or an organic nitrite compound selected from hydrocarbyl lower alkyl nitrite, hydrocarbyl lower alkyl nitro compound or aromatic nitro compound of up to 10 carbon atoms.

9. The process of claim 8 wherein the organic nitro or nitrite compound is aromatic nitro compound of up to 2 nitro groups and up to 10 carbon atoms selected from hydrocarbyl aromatic nitro compound or substituted hydrocarbyl aromatic nitro compound wherein any substitutents are halo, haloalkyl, hydroxy, carbalkoxy or yano.

10. The process of claim 9 wherein the aromatic nitro compound is nitrobenzene.

* * * * *